Dec. 15, 1936.   A. H. ABELL   2,064,099
STARTER FOR ENGINES
Original Filed Aug. 31, 1931
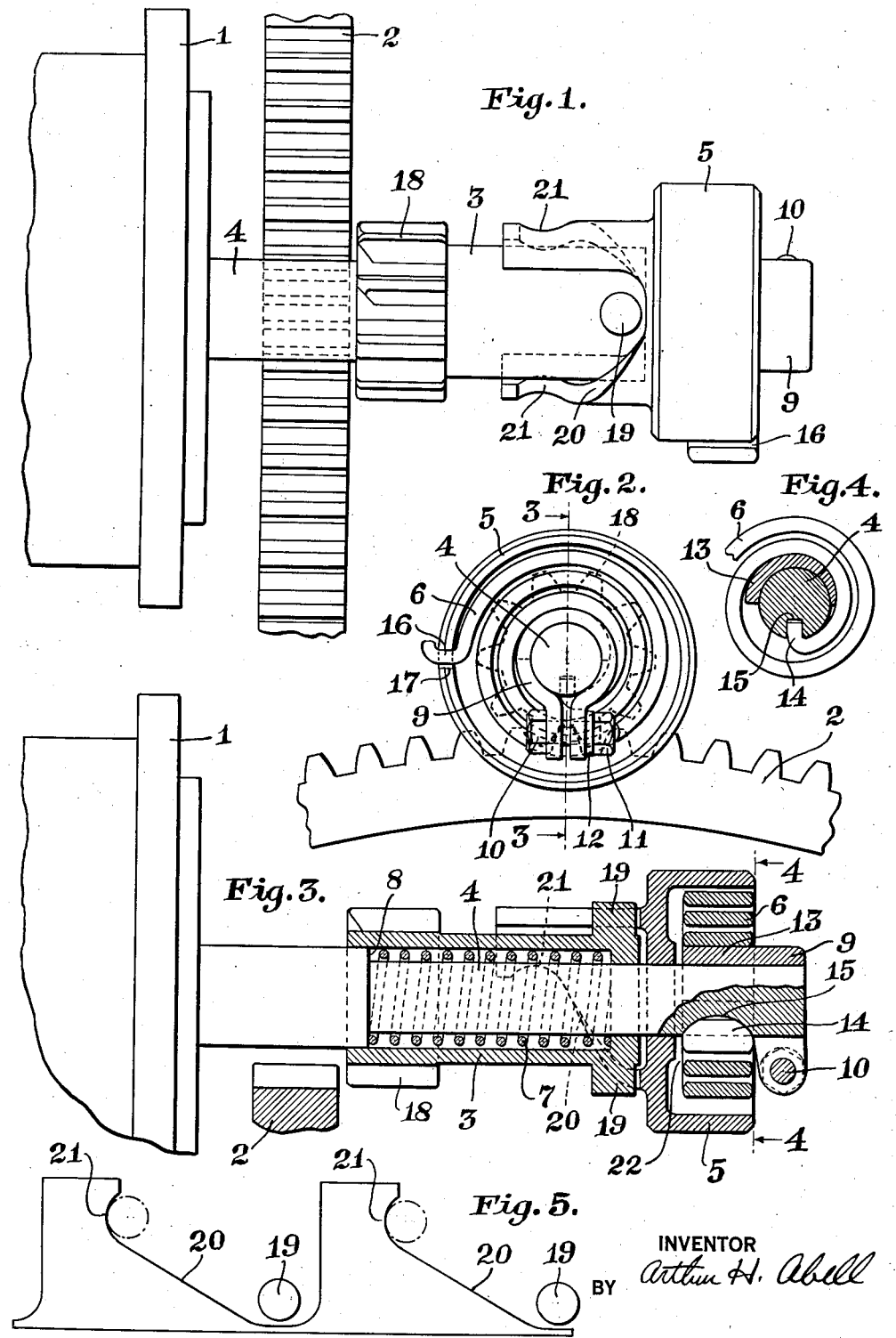
INVENTOR
Arthur H. Abell
BY
ATTORNEY Patented Dec. 15, 1936

2,064,099

UNITED STATES PATENT OFFICE 2,064,099

STARTER FOR ENGINES

Arthur H. Abell, New York, N. Y.

Refiled for abandoned application Serial No. 560,326, August 31, 1931. This application April 7, 1936, Serial No. 73,170

3 Claims. (Cl. 74—9)

This application is a refile of abandoned application Ser. No. 560,326 and the within disclosed invention relates to improvements in starting gear for internal combustion engines. It relates specifically to a driving member, mounted on the shaft of an electric motor, which effects a driving engagement, due to the inertia of one of its parts at the moment the electric motor starts, said part being moved out of engagement by means of a spring the moment the engine starts to run by its own power.

One object of my improvement is to avoid failures in engagement due to friction between the part which, due to its inertia, tends to remain stationary and the part which urges it into engagement with the engine; as the inertia must be a greater force then the turning effort due to friction between the two parts, or the latter will turn the former without causing it to engage with the engine. My object is, therefore, to employ a construction having a minimum of friction, which will be increased to a negligible degree by foreign particles, or the extreme viscosity of lubricants due to low temperatures.

Another object is to absorb the shock of engagement by so constructing the spring employed for that purpose that it provides the maximum softness of action attainable with a spring of a given dimension.

A further object is to employ an integral part of said spring as a key for transmitting torque from the starting motor shaft to the spring.

A further object is to reduce to a minimum the tooth pressure between the driving pinion and the engine gear, the moment the engine starts to run on its own power, to permit the use of a light disengaging spring which resists to a minimum degree the engagement of the driving pinion with the engine gear, due to the inertia of the pinion member.

These objects are attained by the mechanism illustrated by the accompanying drawing, in which—

Fig. 1 is a plan view;

Fig. 2 is a right end view;

Fig. 3 is a sectional side view taken on the line 3—3 of Fig. 2;

Fig. 4 is a sectional end view taken on the line 4—4 of Fig. 3; and

Fig. 5 is a diagrammatic development of the cam formed on one of the members.

Similar numerals refer to similar parts throughout the several views.

The starting-motor 1 is attached to a stationary part of the internal combustion engine, of which 2 is a gear attached to the rotary member of the engine. The pinion-member 3 is mounted on the starting-motor shaft 4, on which it is free to turn and also to slide. The cam-drum 5 is also free to turn and slide on the shaft 4. The spiral spring 6 is interposed between the shaft 4 and the cam-drum 5. The helical spring 7, enclosed in the annular space between the pinion-member 3 and the shaft 4, abuts at one end on the shoulder 8 of the shaft 4 and at the other end on the bottom of the hole in the pinion member 3.

The collar 9 is clamped on the shaft 4 by means of the bolt 10 and nut 11, under which is a spring lockwasher 12. A half sleeve 13, formed on the collar 9, is shown in section in Fig. 4. It constitutes a curved wedge, inserted between the starting-motor shaft 4 and the inner convolution of the spiral spring 6, which causes the bent-in end 14 of the spring to stay in engagement with the curved slot or key-way 15 in the shaft 4. The spring end 14, is, in effect, a key, formed as an integral part of the spiral spring 6, for transmitting torque from the shaft 4 to the cam-drum 5, to which the outer end of the spring is attached by the engagement of the bent-out end 16, of the spring 6, with a slot 17 in the cam-drum 5. The inner end of the spiral spring 6 abuts against the collar 9.

On one end of the pinion-member 3 are chamfered gear teeth 18 and on the other end are two radial lugs 19—19, diametrically opposite each other. On the cam-drum 5 are formed two diametrically opposite and similar cams 20—20, which engage with the lugs 19—19 when the starting-motor operates, but are not in contact with them when it is at rest. The clearance between the lugs and the cam surfaces is determined by the length of the coil spring 7, when extended. The cams 20—20 are helical and when developed on a plane surface have a uniform or straight-line pitch, as shown by Fig. 5. The outer ends of the cams terminate in abutments 21—21, which drive the pinion member 3 positively through its lugs 19—19, immediately after its gear teeth 18 are fully in mesh with the engine gear 2, thereby starting the engine.

If desired a single cam may be employed instead of the double cam described and shown.

The engagement of the gear teeth 18 with the engine gear 2, is due to the inertia of the former, as in other starter drives of the well known inertia type, in which a screw or a cam is employed. In my improved form of drive, the disengagement is caused by a spring, acting independently of the cam which causes the driving engagement. When the engine starts to run on its own power the peripheral speed of the engine gear is suddenly increased beyond the speed at which, up to that moment, it had been driven by the starting motor 1. Consequently the pinion member 3 is driven by the engine gear 2 at a higher speed then than that of the starting motor 1 and heavy tooth-pressures between the gear and pinion are relieved, as the pinion member is free to turn idly on the shaft of the starting motor 1, moving the lugs 19—19 away from the abutments 21—21 at the outer ends of the cams 20—20. At that moment the gear friction is negligible and a light coil spring 7 suffices to slide the pinion teeth 18 out of engagement with the engine gear 2. The lighter the spring, the greater is the preponderance of the inertia of the pinion member 3 over the force required (at the moment the starting motor 1 moves from rest at the beginning of the cycle) to compress the spring 7 sufficiently to slide the pinion member 3 into engagement with the engine gear 2. A very small force is required to compress the light coil spring 7 to that degree (a small proportion of its length) and the engagement is, therefore positive. That force, however, is ample to hold the pinion member 8 out of engagement with the engine gear 2, when the engine is running.

At the beginning of the starting cycle it is essential in order to ensure the preponderance of the force of inertia, to have a minimum amount of friction between the pinion member 8 and the rotating parts which come in contact with it. That is accomplished by providing two widely spaced short bearing surfaces at the ends of the pinion member 8, in which the shaft 4 of the starting motor 1, is free to rotate. Because of the small area of contact, with the parts in the position shown, cold, viscous lubricants have but little tendency to cause the adhesion of the pinion member 3 to the shaft 4. The small contact area also offers little opportunity for foreign particles to increase the friction to a degree which would overcome the inertia of the pinion member 3. As the cams 20—20 are not in contact with the trunnions 19—19, there is no initial friction between them. This contributes to the surety of engagement due to inertia.

The wide spacing of the bearing surfaces avoids cramping or binding when the pinion member 3 is actuated by the cams 20—20 and permits of small bearing clearances. The pitch-circle of the pinion teeth 18 is thereby maintained and chattering is avoided when the pinion member 3 drives the engine gear 2.

As the inner end 14, of the spiral spring 6, is bent in radially and formed to constitute a key for transmitting torque from the starting motor shaft 4 to the spring, the space which would be required by a collar or other means for attaching the spring to the shaft is conserved. This construction permits the use of the maximum number of convolutions in a spiral spring of a given diameter, thereby attaining ample flexibility for cushioning the impact of engagement when the trunnions 19—19 contact with the abutments 21—21 at the ends of the cams 20—20.

When the gear teeth 18 engage with the engine gear 2, the impact is cushioned by a telescoping action of the spiral spring 6, as the outer end 16 is in contact with the bottom of the slot 17 in the cam-drum 5 and a space 22 is provided to allow the cam drum to slide on the shaft 4.

Although a spring of any desired cross-section may be employed, one having its minor dimension transverse to the axis of rotation of the shaft 4 and the cam-member 5 is preferred to accomplish the desired relative degrees of cushioning effect when the cam-member is subjected first to the impact tending to slide it on the shaft and then to the impact tending to turn it on the shaft. The latter impact being due to the positive driving engagement between the cam elements on the pinion-member 3 and the cam-member 5, it is desirable to provide a spring of such proportions that it is more flexible and permits a turning movement of greater amplitude in cushioning that impact than in yielding to the impact transmitted to the cam-member by the butt-end contact between the teeth on the pinion-member 3 and the gear 2 attached to the engine.

If desired, the space 22 may be increased and a coil-spring, surrounding the shaft 4, may be inserted to cushion the impact caused by the butt-end contact of the gear teeth.

What I claim is:

1. A starter for engines comprising, in combination with an engine gear wheel, a motor driven shaft, a cam-member mounted on the shaft and free to turn and slide thereon, a spring with one end in driving engagement with the shaft and the other end in driving engagement with the cam-member, a sleeve also mounted on the shaft and free to turn and slide thereon, lugs on the end of the sleeve adjacent to the cam-member, gear teeth on the other end of the sleeve adapted to slide into mesh with the engine gear-wheel, helical surfaces on the cam-member adapted to slide the sleeve on the shaft, thereby meshing its teeth with the engine gear-wheel, abutments at the outer ends of the helical surfaces adapted to make positive driving contact with the lugs on the sleeve and a spring adapted to act in opposition to the sliding motion imparted to the sleeve by the cam-member.

2. An engine starter comprising in combination with an engine gear-wheel, a motor driven shaft, a cam-member and a sleeve, both independently mounted on the shaft and free to turn and slide thereon and to rotate therewith, a spring attached at one end to the shaft and at its other end to the cam-member, coacting cam elements on the cam-member and the sleeve adapted to slide the sleeve on the shaft, gear teeth on the sleeve adapted to slide into driving engagement with the engine gear-wheel, abutments on the cam-member adapted to engage with and rotate the sleeve, thereby turning the engine gear-wheel, and a spring, acting in opposition to the cam action, to disengage the gear teeth from the engine gear-wheel and hold them out of engagement when the rotation of the motor driven shaft ceases.

3. In a starter for engines, the combination of a motor driven shaft, a radial slot in the shaft, a spiral spring having its inner end inserted in the slot, a collar secured to the shaft contiguous to the spring and a segmental portion of said collar, inserted between the shaft and the inner convolution of the spring, adapted to hold the inner end of the spring in engagement with the shaft.

ARTHUR H. ABELL.